June 17, 1930. J. M. CRAIGO 1,764,244
DENTAL IMPRESSION INSTRUMENT
Filed Oct. 17, 1928
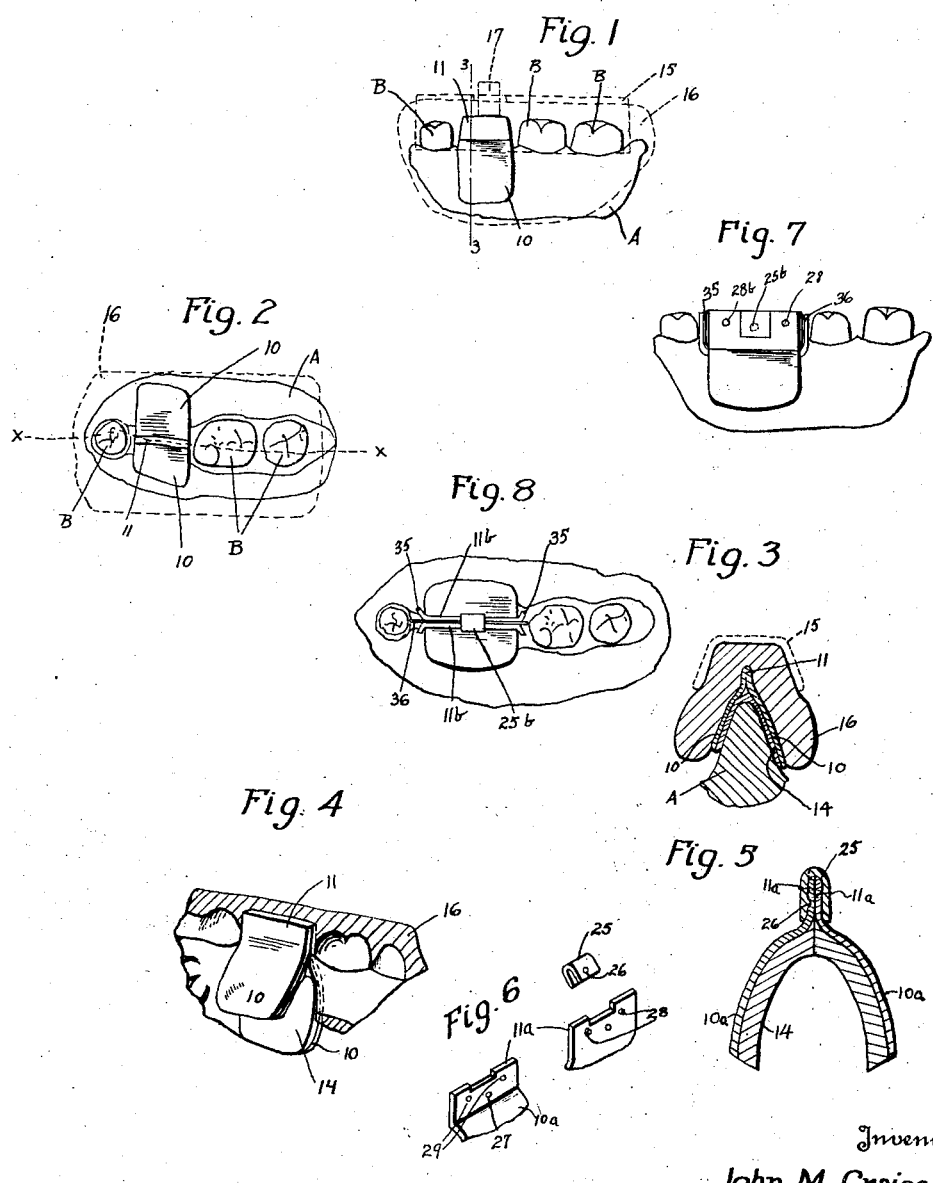
Inventor
John M. Craigo
his Attorney Patented June 17, 1930

1,764,244

UNITED STATES PATENT OFFICE

JOHN M. CRAIGO, OF HARTFORD, CONNECTICUT

DENTAL IMPRESSION INSTRUMENT

Application filed October 17, 1928. Serial No. 313,020.

This invention relates generally to dentistry, and has particular reference to that part of the art pertaining to the taking of impressions of the gums and teeth of the mouth.

It has been the practice, in taking an impression of teeth and adjacent areas, to apply a material in plastic condition thereto, then let the plastic harden, and then remove the hardened plastic. In removing the plastic or mould, it was necessary to break the same, and there was no way of determining or controlling the manner of breaking. Not infrequently, the impression mould would break into a large number of parts, which would have to be re-assembled and secured together, a procedure which required considerable skill and time and resulted in imperfect work.

Also, in taking the impression, as has heretofore been done, there was no way of properly compressing the tissues of the gum so that there was more or less of a hit-and-miss relation between the gums and the final bridge work.

The aim of the present invention is to make it possible to take more accurate impressions with greater rapidity and facility.

A further aim of the invention is to make it possible to take an impression in which a definite relation is established between the gum over which the bridge work is adapted to be applied and the abutting teeth to which the bridge work is adapted to be secured so that the bridge work will be properly supported by the gums.

A further aim of the invention is to provide an improved arrangement which will eliminate the above and other objections to the practice of taking impressions as heretofore carried out. In accordance with the present invention, I provide a device or instrument which may be used in making the impression and which will determine quite accurately the line on which the hardened plastic mold is split preliminarily to removing the same from the mouth. By proceeding in accordance with the present invention, the mould may be split longitudinally into two halves instead of a number of parts as heretofore, and these halves may be re-assembled in accurate relation to one another—all of which means that considerable time is saved and a better impression is obtained than has heretofore been possible. Also, in taking the impression, it is possible to properly compress the tissues so that a mould is had in which a definite relation is established between the gum and the abutting teeth.

A further object of the invention is to provide an improved method for taking impressions.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, several embodiments which the present invention may take:

Figure 1 is an elevational view showing, more or less diagrammatically, my device in use in taking an impression of a portion of a gum and the abutting teeth;

Fig. 2 is a top plan view of what is shown in Fig. 1;

Fig. 3 is a sectional view of the mould taken substantially on line 3—3 of Fig. 1;

Fig. 4 is a perspective view looking at the inside of one half of my improved impression mould;

Fig. 5 is a view similar to Fig. 3, but showing my improved device in more than one part;

Fig. 6 is a perspective view of parts of Fig. 5, and shows the means by which these parts are secured together;

Fig. 7 is a view similar to Fig. 1, but showing another embodiment of the invention; and Fig. 8 is a top plan view of what is shown in Fig. 7.

Referring to the drawings in detail, A denotes one of the jaws of the mouth, and B designates permanent teeth, between two of which is a gap which is to be filled in by bridge work. My improved device comprises what may be for convenience a saddle having a pair of wings 10 adapted to straddle the gum where one or more natural teeth are missing. This saddle also has, at its apex, a rib, flange or fin 11 which, as hereinafter described more in detail, is adapted to extend into the plastic material so as to form a predetermined line of weakness or fracture therein. In the embodiment shown in Figs. 1 to 4, my improved saddle is formed of a single piece of sheet metal folded over upon itself, but, as hereinafter described more in detail in connection with the following embodiments, it may be of more than one part. The saddle is preferably made of a material which may be bent to shape so that the wings may be of such pliability as to conform to the gum and yet hold their form during the act of taking an impression.

The following method is employed in taking an impression. The saddle is first cut to the desired shape and the wings are bent so as to adapt them to the curvature of the tissue to which the saddle is to be applied. Then the saddle has applied to its inside walls a compound or plaster which will quickly harden. A composition, such as Kerr's or S. S. White's dental compound which, when heated, is plastic and which, when cold, is hard, may be used for this purpose.

The saddle, with the composition therein in plastic condition, is put over the gum, and then pressed down so that an impression is obtained within the saddle. In taking this impression, the plastic will quickly set when it becomes cool or when it becomes dry, as the case may be. The saddle is now taken out, and the edges of the internal impression mould 14 are trimmed. Then the saddle, with the internal mould, is put back in place, as shown in Figs. 1 to 3, a tray filled with plastic, and then applied over the saddle and the areas to each side thereof, as shown by dotted lines in Fig. 1. The tray is designated by the numeral 15, and the plaster therein by the numeral 16. If it is desired to compress the tissues beneath the saddle, this may be done by placing a bite block 17 upon the upper edge of the fin 11. The tray, of course, will have an opening to accommodate this block. The tray is also pressed down towards the teeth, an impression of which is desired. The plaster within the tray will, of course, flow around the edges of the saddle so that the saddle is sunk into the external impression mould. After the body portion 16 has hardened sufficiently, the tray is removed. The next step is to remove the mould from the mouth. This cannot be done by merely withdrawing it, because of the shape and arrangement of the teeth. It is, therefore, necessary to break the mould, and this is done by applying a tool to the upper edge thereof along the line of the fin 11. Owing to this fin which has made a line of weakness or fracture, the mould will break longitudinally, in the present instance substantially on the dotted line $x$—$x$ shown in Fig. 2. The two halves of the mould may now be taken out of the mouth.

It is very likely that, in breaking the body portion of the mould, one-half thereof will pull away from the saddle while the saddle will remain in position in the other half. In Fig. 4, the saddle is shown as being held in one half of the body portion 16. The mould is now assembled together by placing the two halves together and holding them in assembled relation by an adhesive or wax of any suitable sort. A mould has now been obtained having an impression which is the exact replica of the portion of the jaw to which the bridge work is adapted to be applied. The impression on the internal mould 14 forms a continuation, so to speak, of the impression in the external mould 16. It will be observed that after the parts have been assembled, the saddle forms a reinforcement which holds the members in accurate relationship. The composite impression mould is now used in the usual way for the purpose of casting a model from which to form the artificial bridge.

It will be observed that, by proceeding in accordance with the present invention, it is very easy to take an impression, remove the impression mould from the mouth and then assemble the parts of the same into proper relation. The impression is very accurate so that an exact model can be obtained.

In the embodiment shown in Figs. 5 and 6, the saddle is shown as being formed of two parts held together by a clip 25. Each of the wings 10$^a$ has a flange 11$^a$, and these flanges are adapted to abut, as shown in Fig. 5, so as to form a rib similar to, and performing the same function as, the rib 11 of the preceding embodiment.

The clip 25 is of generally U shape; is adapted to straddle the flanges 10$^a$, and is held in place by a little nib 26 engaging in a recess 27 under one of the flanges. In order to bring the two members of the saddle into predetermined relation to one another, one of the flanges has dowel pins 28 which are adapted to engage in openings 29 in the other flange. When the saddle is formed of two parts, as shown in Figs. 5 and 6, the internal mould 14 may be formed therein, as in the preceding embodiment, and then this mould may be broken into two halves, the respective halves adhering to the wings 10$^a$.

Figs. 7 and 8 disclose an embodiment somewhat similar to that shown in Figs. 5 and 6. In this embodiment, however, each of the flanges 11$^b$ has, at each end, an outturned lug 35. It will be observed that, when the plaster is placed about the saddle, the lugs 35 embed themselves into the plaster, thus anchoring the two parts of the saddle in the respective halves of the mould when the latter is broken. Between the flanges 11$^b$, there is provided a dividing plate 36 which, preferably, extends beyond the ends of the flanges. This dividing plate is made of very thin metal and is preferably cut so that it extends substantially from one abutting tooth to the other abutting tooth. The purpose of this plate is to form a line of division or line of fracture in the external mould immediately adjacent the teeth between which the saddle is positioned. The parts of the saddle and the dividing plate are properly aligned by dowel pins 28$^b$, and these parts are held together by a clip 25$^b$.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A device adapted to constitute a part of a dental impression mould, and comprising a saddle formed of two parts, each part having a wing and a flange, said wings being adapted to straddle the gum and said flanges being adapted to abut against one another, one of said flanges having dowel pins, the other of said flanges having openings in which said dowel pins are adapted to engage, and a U-shaped clip fitting about said flanges for holding parts together.

2. A device adapted to constitute a part of a dental impression mould, and comprising a saddle having a pair of wings adapted to straddle the gum, and a rib at the apex of the saddle, said rib having at its opposite ends outwardly extending lugs.

3. A device adapted to constitute a part of a dental impression mould, and comprising a saddle having two similar members each provided with a wing and a flange, said wings being adapted to straddle the gum and said flanges being adjacent, each of said flanges having at each end an outwardly extending lug, and means for securing the parts together.

4. A device adapted to constitute a part of a dental impression mould, and comprising a saddle having a rib, a pair of wings extending from said rib, said rib having at each end outwardly extending lugs, and dividing elements between said lugs.

5. A device adapted to constitute a part of a dental impression mould, and comprising a saddle having a rib adapted to form a line of weakness in the composition in which the impression is formed, and a dividing plate extending beyond the ends of said rib.

JOHN M. CRAIGO.